(12) United States Patent
Benitz

(10) Patent No.: US 6,628,844 B1
(45) Date of Patent: *Sep. 30, 2003

(54) HIGH DEFINITION IMAGING APPARATUS AND METHOD

(75) Inventor: Gerald R. Benitz, Harvard, MA (US)

(73) Assignee: Massachusetts Institute of Technology, Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,994

(22) Filed: Feb. 19, 1998

Related U.S. Application Data

(60) Provisional application No. 60/038,234, filed on Feb. 19, 1997.

(51) Int. Cl.$^7$ ................................................. G06K 9/36
(52) U.S. Cl. ................... 382/276; 382/277; 382/280; 382/281
(58) Field of Search ............................... 382/276, 277, 382/280, 281

(56) References Cited

U.S. PATENT DOCUMENTS

| | | | | |
|---|---|---|---|---|
| 4,931,977 A | * | 6/1990 | Klemes | ...................... 364/581 |
| 5,357,964 A | * | 10/1994 | Spivey et al. | .......... 128/661.09 |
| 5,576,950 A | * | 11/1996 | Tonomura et al. | ...... 364/514 A |
| 5,781,845 A | * | 7/1998 | Dybdal et al. | ................ 455/65 |

* cited by examiner

*Primary Examiner*—Bhavesh M. Mehta
*Assistant Examiner*—Kanji Patel
(74) *Attorney, Agent, or Firm*—Samuels, Gauthier & Stevens, LLP

(57) ABSTRACT

A high definition radar imaging system receives SAR image data and adaptively processes the image the data to provide a high resolution SAR image. The imaging technique employs an adaptive filter whose tap weights are computed based upon a constrained Maximum Likelihood Method (MLM). The MLM technique chooses the filter tap weights (i.e., a weighting vector $\omega$) to satisfy several criteria including: 1) they preserve unity gain for a point scatter at the desired location, and 2) they minimize the perceived energy in the output image. The weights $\omega$ are constrained in norm $\|\omega\| \leq \beta$, to reduce the loss of sensitivity to bright scatters. Significantly, the present invention applies an additional constraint on the iterative selection of the weighting vector $\omega$, such that the weighting vector $\omega$ shall confined to a particular subspace in order to preserve background information in the image. This constraint is accomplished by confining the selection of the weighting vector $\omega$ to the subspace defined by the linear space of the columns of a covariance matrix generated from the data.

3 Claims, 10 Drawing Sheets

HIGH DEFINITION IMAGING APPARATUS AND METHOD

CROSS REFERENCE TO RELATED APPLICATIONS

This application claims priority to the provisional application designated Ser. No. 60/038,234, entitled "*High Definition Vector Imaging*" and filed Feb. 19, 1997. This application is also hereby incorporated by reference.

GOVERNMENT RIGHTS

This invention was made with government support under Contract F19628-95-C-0002 awarded by the U.S. Air Force. The government has certain rights in the invention.

DESCRIPTION

1. Technical Field

The invention relates to the field of signal processing, and in particular to a signal processing apparatus and method which processes data captured from a sensor such as a synthetic aperture radar to provide a high resolution image.

2. Background of the Invention

Synthetic aperture radar (SAR) is a well known technique for imaging stationary objects. SAR is an all weather imaging radar system which provides a high resolution image in both the range dimension and the cross range dimension. Range resolution is achieved in a well known manner by using either a high bandwidth fixed frequency transmit pulse or a frequency modulated (FM) transmit pulse. Resolution in the cross range dimension is achieved by synthesizing a large antenna aperture.

In a conventional non-synthetic aperture radar system, resolution in the cross range dimension is:

$$\delta_{cr} R \theta_B \qquad (Eq. 1)$$

where:

$\delta_{cr}$=cross range

R=range $\theta_B$=beamwidth of the transmitted signal in radians

Therefore, to improve the cross range resolution $\delta_{cr}$ the beamwidth $\theta_B$ must be decreased. $\theta_B$ is defined as:

$$\theta_B = (k\lambda)/D \qquad (Eq. 2)$$

where:

k=constant $\lambda$=wavelength of the transmitted signal (i.e., $c/f_c$)

D=antenna width c=speed of light $f_c$=carrier frequency

Substituting Eq. 2 into Eq. 1, one can see that for improved cross range resolution $\delta_{cr}$ the radar designer can either increase the antenna width D or decrease the wavelength $\lambda$ of the transmitted signal. However, there are clearly limits on how large the antenna width D can get (especially on an airborne platform) to achieve cross range resolution satisfactory for imaging. Similarly, the wavelength $\lambda$ can be decreased only so far before it becomes so short that the radar performance becomes degraded in foul weather conditions (e.g., rain, snow and sleet), or the system becomes impractical because of the bandwidth requirement. SAR solves this problem by employing signal processing techniques which allow a larger antenna of width D' to be synthesized using the motion of the radar platform (e.g., an antenna mounted on an aircraft). That is, SAR achieves cross range resolution by using the motion of the vehicle carrying the radar to generate a synthesized antenna of size D' sequentially, rather than simultaneously as in the case with a real antenna of the same size.

The key to SAR is the data processing of stored reflected return data, and the amplitude weighting, phase shifting and coherently summing of the data to form the synthetic aperture radar antenna of width D'. For an overview of SAR see "*An Introduction to Synthetic Aperture Radar*" by W. M. Brown and L. J. Porcelli, IEEE Spectrum (September, 1969) pages 52–62.

An airborne SAR system is typically used to map or image a specific ground terrain (also referred to herein as a SAR scene). As an example, FIG. 1 illustrates a SAR equipped aircraft 20 flying along a flight path 22 monitoring a certain SAR scene 24. The SAR equipped aircraft 20 transmits a series of RF pulses towards the SAR scene 24 and receives backscattered RF energy whose information content is indicative of the terrain and other reflecting objects on the terrain (e.g., buildings, trucks, cars, ships, planes . . . ). A short time later the aircraft 20 is located at a second location 28 along the flight path 22 and again transmits RF energy towards the SAR scene 24. As known, the distance traveled by the aircraft between pulse transmissions should be less than one-half the illuminating aperture size when the radar's line of sight is perpendicular to the platforms velocity vector. The received RF energy at the second location 28 is again indicative of the SAR scene but this time it is taken from a different view. Since radar signals travel at the speed of light, it is known precisely when a return signal is likely to come from SAR scene 24 at a given range from the aircraft 20. Accordingly, for each transmitted RF pulse there will be a plurality of return signals corresponding to the various scatterers within the SAR scene located at various ranges from the aircraft. These returns can be processed in real-time or off-line to create an image of the SAR scene 24 and stationary objects therein using the Doppler history of the objects. That is, each return signal contains the radar carrier frequency signal $f_c$ component with a Doppler shift in frequency ($f_c \pm f_d$) which in reality is the phase of the backscattered signal as a function of time with respect to the phase of the transmitted signal.

Referring to FIG. 2, an SAR system 30 includes an antenna 32 which transmits pulsed RF energy (e.g., X or Ku band) and receives backscattered RF energy from the illuminated SAR scene 24 (FIG. 1). The radar system 30 includes an exciter 34 and an amplifier 36 which generate and provide an uncompressed pulse of RF energy signal on a line 38 which is coupled to the antenna 32.

To obtain fine range resolution, a linear FM waveform is used in which frequency value $f_c$ is changed linearly from a frequency value $f_1$ to a value $f_2$ over the transmitted pulse length $\tau$. This allows the radar to utilize a long pulse to achieve a large amount radiated energy while retaining the range resolution associated with a shorter pulse. Other known pulse compression techniques include nonlinear FM, discrete frequency shift, polyphase codes, phase coded pulse compression, compound Barker codes, coding sequences, complementary codes, pulse burst and stretch.

During receive mode, each antenna 32 receives backscattered RF energy data indicative of the SAR scene 24 (FIG. 1) being imaged and provides a received signal on a line 42 to a receiver 44. The receiver 44 coherently processes the received signal data and provides a received signal on a line 46 containing both in-phase(I) and quadrature(Q) data to a signal processor 48. A coherent reference signal is generally required for the signal processing since an azimuth angle measurement is a measurement of phase from spatially separate positions. That is, the coherent radar remembers the phase difference from transmission of a pulse to reception of the backscattered energy from the pulse. The received signals contain the carrier signal $f_c$ with a Doppler shift $f_d$ in frequency, which in reality is its phase versus time.

Each backscattered RF signal is often converted to a digital signal format as early as possible in the signal processing sequence due to the greater degree of design flexibility inherent in the discrete time domain. This often occurs after the RF received signal has been bandshifted to an intermediate frequency (IF) and then to a video signal having both an in-phase(I) and quadrature(Q) component. The sampling rate of the analog-to-digital converter (ADC) (not shown) must be fast enough to meet the well known Nyquist sampling criteria to prevent alaising. Once sampled and digitized, the received video signal containing the I and Q signal components can be processed by the signal processor 48 to image objects within the SAR scene. A radar processor/controller 50 controls the operation of the radar system based upon inputs received from an operator control panel/interface 52 and the current operating condition of the radar system. Images formed by the signal processor are presented on a display 54. The system also includes a memory storage 56 wherein received data can be stored for subsequent, non-realtime processing.

FIG. 3 illustrates a top-level functional block diagram of signal processing routines 60 performed either in real-time or off-line to image stationary object within the SAR scene 24 (FIG. 1). To implement the routines in real-time, one skilled in the art will appreciate that the signal processor 48 requires a large amount of data storage and processing power.

The signal processor 48 executes a data calibration routine 62 which receives the digitized in-phase(I) and quadrature(Q) signals on the line 46 from the receiver 46 (FIG. 2) to correct for any front end hardware inaccuracies. The processing steps may include subroutines to: i) remove the DC biases of the channel's ADC; ii) ensure that the inphase(I) and quadrature(Q) components of the signal are in true quadrature; iii) balance the I–Q gains and correct for receive chain mismatches including time alignment; and iv) gain and phase versus frequency alignment. The data calibration routine also includes a pulse compression subroutine which provides compressed data in a well known manner in the frequency versus time domain. Pulse compression techniques used to increase the total RF energy while maintaining high range resolution are well known. Once complete, the data calibration routine 62 provides calibrated received signals on a line 64. In general, the data calibration routine 62 may include as many hardware receiver chain error corrections as necessary to reduce the amount of error introduced by the receiver 44 to an acceptable systems level. The next processing step is to motion compensate the calibrated received signals on the line 64.

As known, the motion compensation routine compensates for the aircraft motion with respect to the SAR scene 24 (FIG. 1). Because the aircraft is not flying along a straight line or at a constant velocity, the backscattered energy experiences a frequency shift and time delay both as a function of time which must be corrected to provide a coherent phase history of the stationary objects during the dwell time. The dwell time as used herein is the period of time over which the radar system illuminates an area and generally is about 0.1 second to about 10 seconds or more. These corrections are required in a high resolution SAR in order to keep the individual scattering elements on a reflecting target coherent over the dwell period and at squint angles other than 90°. In general, motion compensation is well known and involves electronically adjusting the phase of the received signals on the line 64. Ideally, the processed synthetic aperture information is completely isolated from the effects of undesired aircraft motion during the dwell time.

The distance the aperture has moved pulse to pulse is typically calculated based upon information obtained from an inertial navigation system (INS), an inertial measurement unit (IMU), and/or a global positioning system (GPS) (all not shown). The position measurement signals are provided on a line 68 and the motion compensation routine computes a correction signal value that represents the amount of time delay to be applied to the calibrated received signals on the line 64 to provide motion compensated received signals on a line 70. A new time delay (i.e., a time shift) is applied for each pulse or synthesized pulse if multiple pulses are used to achieve the desired bandwidth using pulse compression techniques. The following papers discuss motion compensation and the details of performing the same: "Motion Compensation for Synthetic Aperture Radar" by J. C. Kirk, Jr, *IEEE Transaction on Aerospace and Electronic Systems, Vol. AES*-11, *No.* 3 (May 1975); "Synthetic Aperture Imaging With Maneuvers" by J. H. Minns and J. L Farrell,); *IEEE Transactions on Aerospace and Electronic Systems, Vol. AES*-8, *No.* 4 (July 1972); and "Effects of Navigation Errors in Maneuvering SAR", by J. L. Farrell, J. H. Minns and A. Sorrell, *IEEE Transactions on Aerospace and Electronic Systems, Vol. AES*-9, *No.* 5 (September 1973).

The next processing step to create an image of the stationary objects in SAR scene 24 (FIG. 1) is performed by a presum routine 72 of the motion compensated received signal on the line 70 to create signal information which can be processed to form the image. Presumming reduces the computational burden of SAR processing by narrow band filtering the azimuth samples (pulses) and reducing the sampling rate. This filtering may be performed by weighting the received signals on the line 70. Presumming is well known and discussed in "Synthetic Aperture Processing With Limited Storage and Presumming" by W. M. Brown, G. G. Houser and R. E. Jenkins; *IEEE Transactions on Aerospace and Electronic Systems, Vol. AES*-9, *No.* 2 (March 1973). Also see "A Discussion of Digital Signal Processing in Synthetic Aperture Radar" by J. C. Kirk, Jr., *IEEE Transactions on Aerospace and Electronic Systems, Vol. AES*-11, *No.* 3 (May 1975). In general, presumming is used to reduce the amount of data which is stored in main memory since the Doppler bandwidth of the system may be larger than what is actually necessary to image the stationary objects in the SAR scene 24 (FIG. 1). Therefore, only the Doppler band associated with stationary objects is retained for further processing.

Next a polar reformat routine 76 received pre-summed data on a line 74 to correct for the distortion of the scatterer's (i.e., an RF reflective surface) position about the center of the SAR scene (often referred to as the map center). A block of reformatted data is provided on a line 78 to subroutine 80 which corrects the reformatted data for fine range slip error which occurs due to the fact the INS is not infinitely accurate. The fine range slip correction value is adaptively computed by the subroutine and applied to prevent range walk by placing all the energy from the same scatter in the same range resolution cell. Range walk is the result of the stationary object "walking" through one or more range resolution cells during the dwell time. The fine range slip correction subroutine 80 then provides a corrected signal on a line 82 to an autofocus subroutine 84 which focuses the image of the stationary objects in the SAR scene. Subroutine 86 then forms the image of the stationary objects in the SAR scene which is enhanced by a brightness transfer subroutine (BTF) 88 that provides a SAR image signal on a line 90. The SAR image signal contains displayable quality images of the stationary objects (i.e., buildings, terrain and parked vehicles) in the SAR scene.

In conventional SAR processing the image is generally formed using a two dimensional Fast Fourier Transform (i.e., a 2-D FFT). A problem with conventional SAR processing is the difficultly of resolving more than one scatter within a resolution cell. This resolution limitation is principally due to the use to a Fourier transform which forms the image. Therefore, there is a considerable need for a system which can process the radar data to provide a higher resolution image of stationary objects.

SUMMARY OF THE INVENTION

An object of the present invention is to provide a higher resolution SAR image.

Briefly, according to the present invention, a high definition radar imaging system receives SAR image data and adaptively processes the image the data to provide a high resolution SAR image. The imaging technique employs an adaptive filter whose tap weights are computed based upon a constrained Maximum Likelihood Method (MLM). The MLM technique chooses the filter tap weights (i.e., a weighting vector $\omega$) to satisfy several criteria including: 1) they preserve unity gain for a point scatter at the desired location, and 2) they minimize the perceived energy in the output image. The weights $\omega$ are constrained in norm $\|\omega\| \leq \beta$, to reduce the loss of sensitivity to bright scatters. Significantly, the present invention applies an additional constraint on the iterative selection of the weighting vector $\omega$, such that the weighting vector $\omega$ shall confined to a particular subspace in order to preserve background information in the image. This constraint is accomplished by confining the selection of the weighting vector $\omega$ to the subspace defined by the linear space of the columns of a covariance matrix generated from the data.

Preprocessing of the SAR image data may be required in order to transform the SAR image data into the proper domain. Specifically, a 2-D inverse FFT is performed on the SAR image data, followed by an amplitude profile correction (e.g., a Hamming or Taylor weighting) to provide frequency domain data. In general, the preprocessing step processes the SAR image data to transform it to the frequency domain and ensure it pixel has a system point response with constant amplitude and linear phase.

The frequency domain data from the preprocessing routine is further processed to make a plurality of different "looks". The different looks are each created from the same frequency domain image provided by the preprocessing routine.

Steering vectors are computed for each of the plurality of range and cross-range pixel elements within the frequency domain image. Each steering is preferably a point-scatterer response having a constant amplitude both azimuth and frequency, and a linear phase. A steering vector is computed for each pixel in the frequency domain image.

The plurality of looks and steering vectors are then processed using the constrained MLM technique to form a high definition image. This technique is an adaptive processing technique which transforms measured SAR data into an intensity profile which provides a matrix of radar cross section data, or energy density, as a function of location (range and cross-range). The present invention accounts for the presence of multiple scatters within a range—cross-range cell and adjusts the radar cross section accordingly.

The present invention replaces the conventional 2-D FFT with an adaptive filter which computes weighting factor corrections (i.e., weighting vector $\omega$) which are applied to the data to provide a high resolution image. These dynamic weighting factor corrections in the weighting vector $\omega$ replace the static weights of the prior art FFT.

Advantageously, by constraining the acceptable solutions for the weighting vector $\omega$ in the iterative processing of the MLM, information regarding the SAR scene background is retained.

These and other objects, features and advantages of the present invention will become apparent in light of the following detailed description of preferred embodiments thereof, as illustrated in the accompanying drawings.

DETAILED DESCRIPTION OF THE INVENTION

Figure 4:
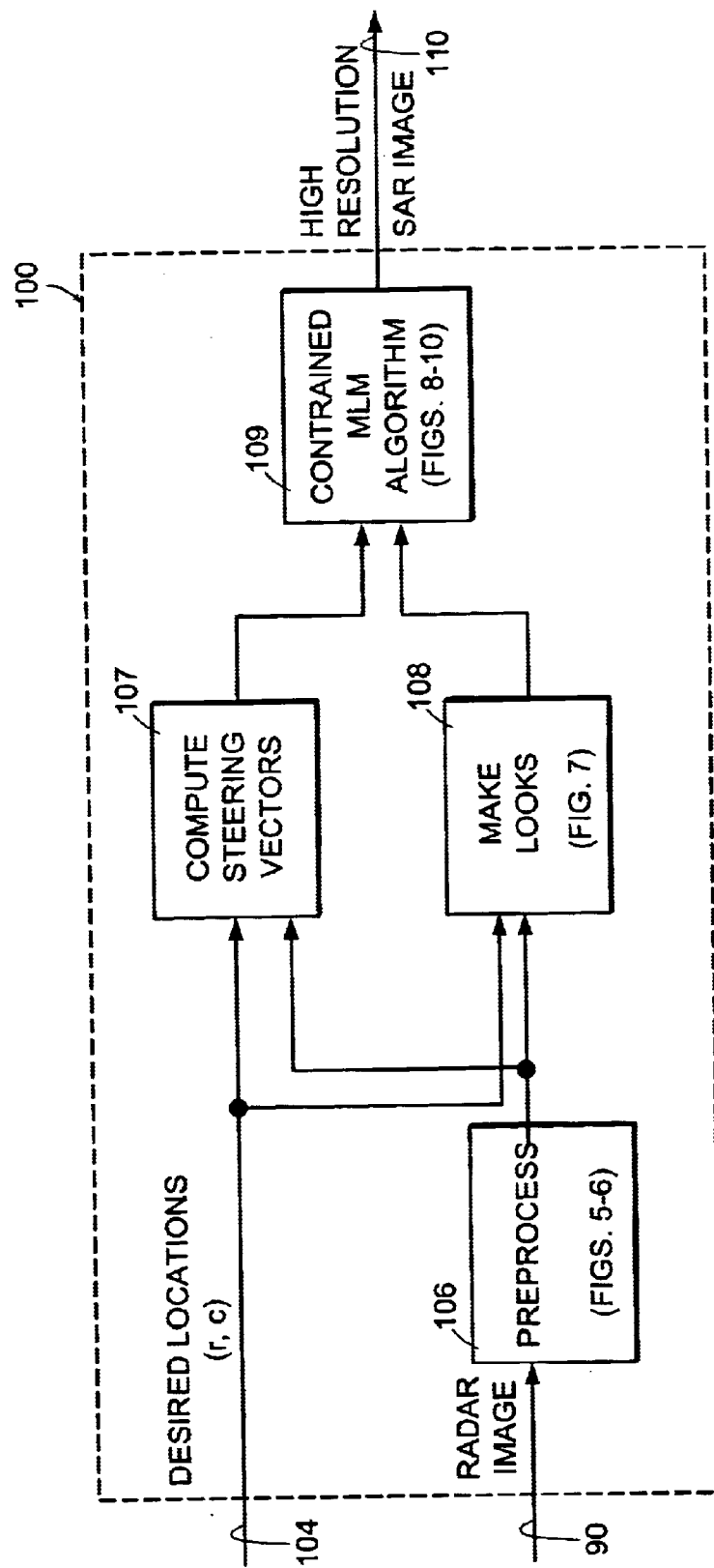
FIG. 4 is a functional block diagram of the processing of the present invention.

FIG. 4 illustrates a functional block diagram of a high definition imaging system 100 of the present invention. The present invention shall be discussed in the context of an off-line (i.e., not real-time) processing system which receives image data from a SAR and reprocesses the image data to form a high definition image. However, it is contemplated that the present invention may also be adapted for use in a real-time SAR imaging system.

Figure 1:
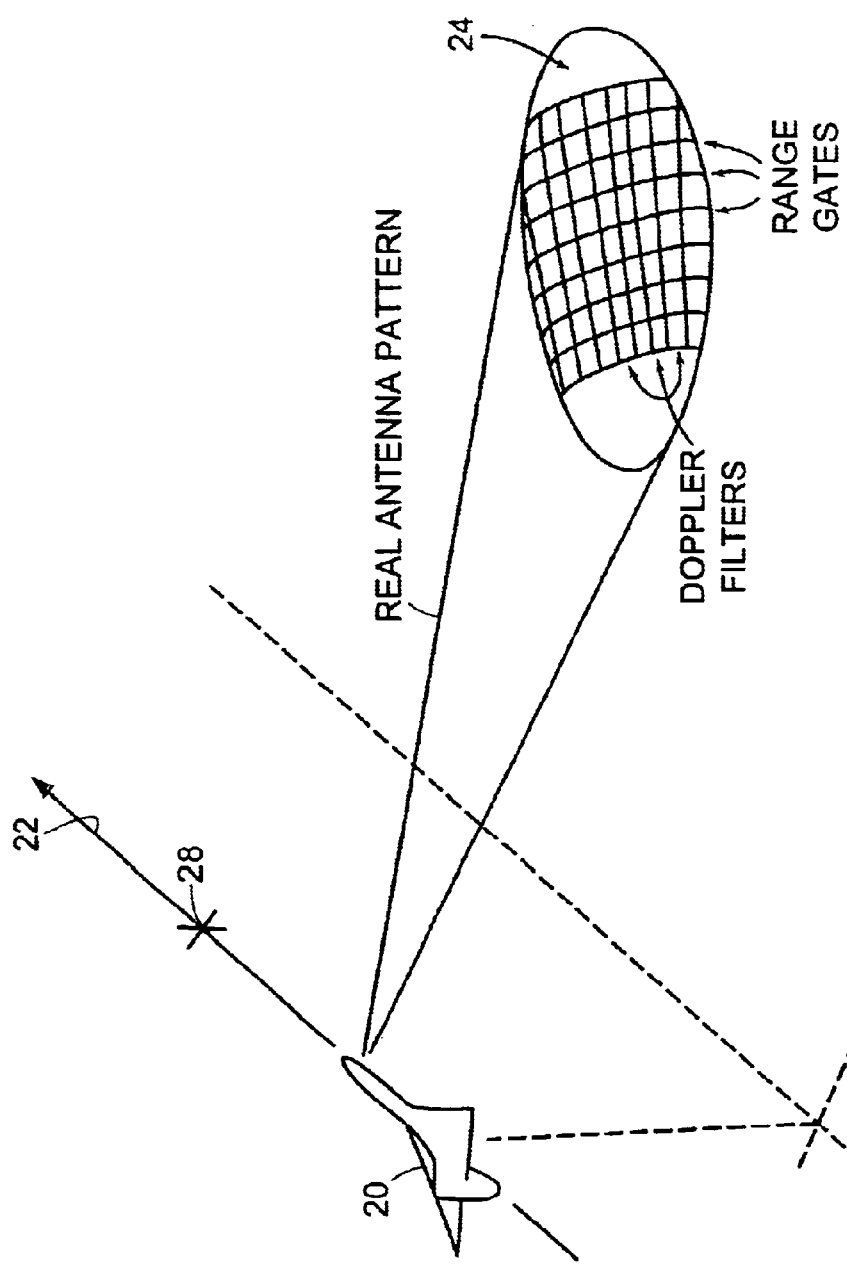
FIG. 1 is a pictorial illustration of a SAR equipped aircraft illuminating a SAR scene.
Figure 2:
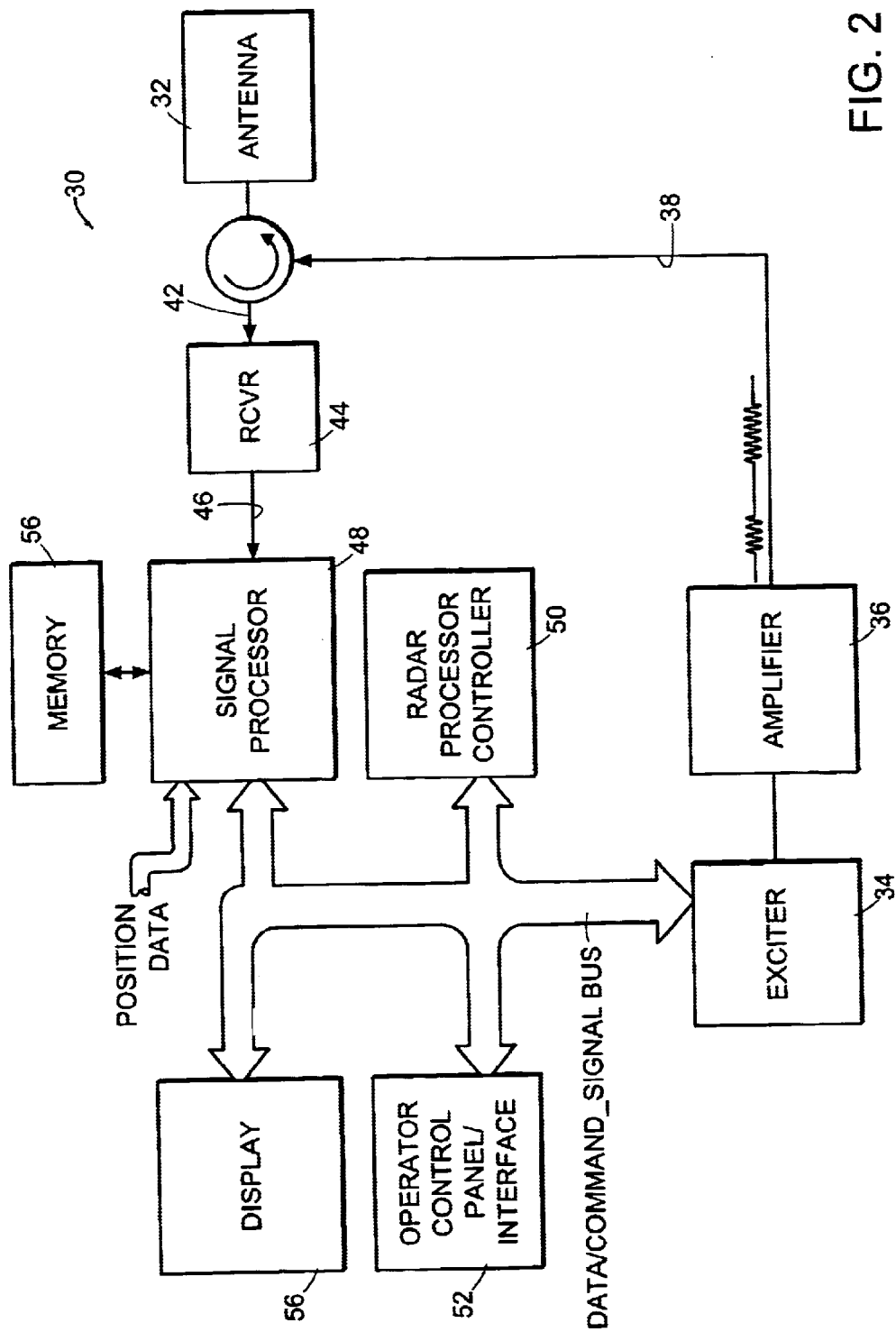
FIG. 2 is a illustrates a functional hardware block diagram illustration of a SAR.
Figure 3:
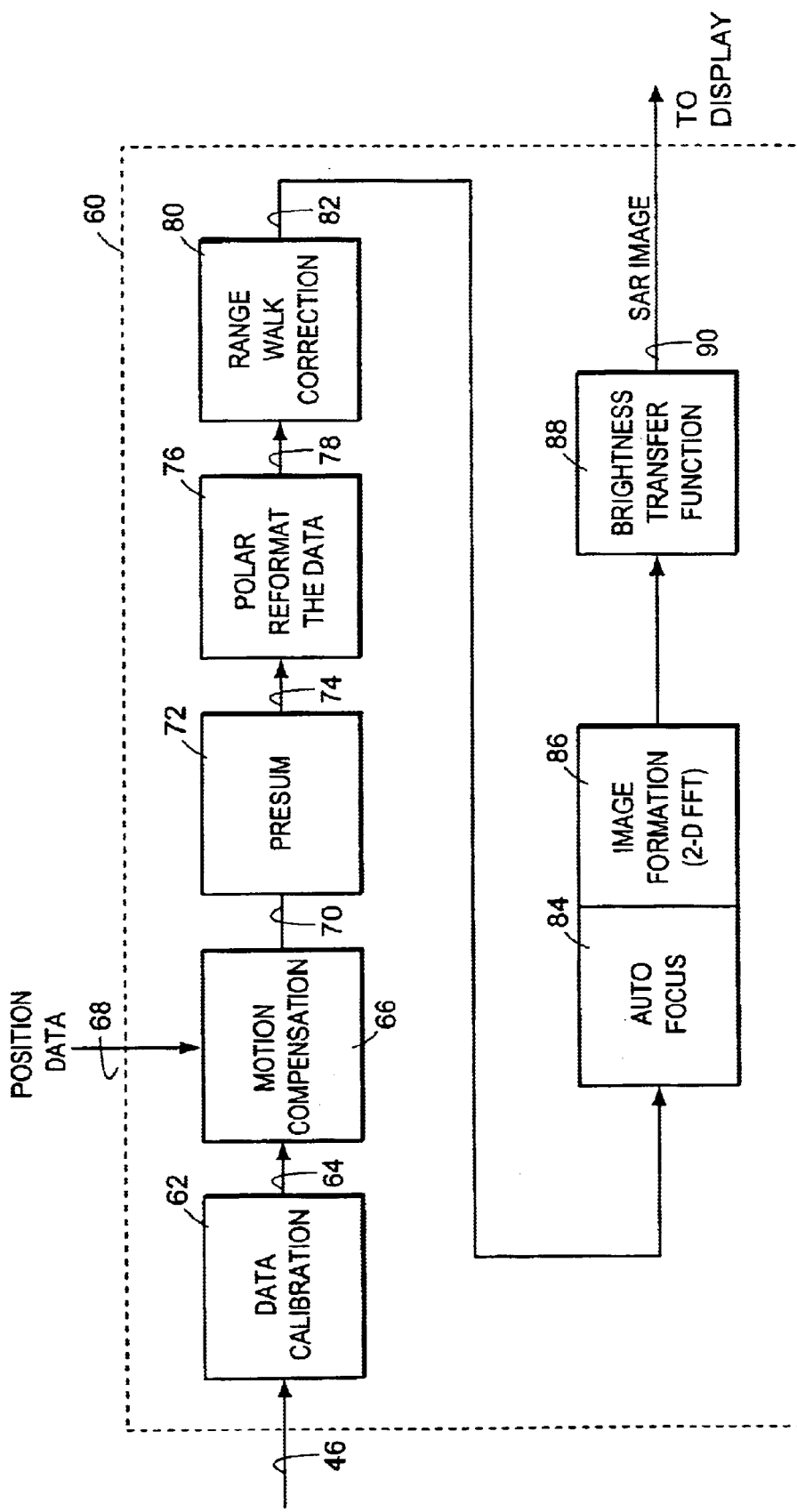
FIG. 3 is a illustrates a functional block diagram illustration of prior art SAR system processing.

The system 100 receives radar data in the spatial domain on the line 90. The system also receives user desired range and cross range information on a line 104. The radar image on the line 90 is a matrix having amplitude and phase information from each pixel (e.g., $A_{11}e^{i\phi_{11}}$). The radar image matrix is input to a preprocessing routine 106 which reverses the conventional SAR image formation process (see FIG. 3) and restores and transforms the data to the frequency domain. In general, the preprocess routine 106 processes the SAR image data in order to transform the data back to a form the data was in prior to the final 2-D FFT of the conventional SAR image processing (see FIG. 3). The imaging system 100 of the present invention also includes a i) compute steering vectors routine 107, ii) a make looks routine 108 and a constrained maximum likelihood method (MLM) routine 109 which forms and provides a high resolution SAR image on a line 110. Each of these routines includes executable software to provides the high definition imaging of the present invention. The details of the four routines 106–109 which comprise the high definition imaging system 100 shall now be discussed in detail.

Figure 5:
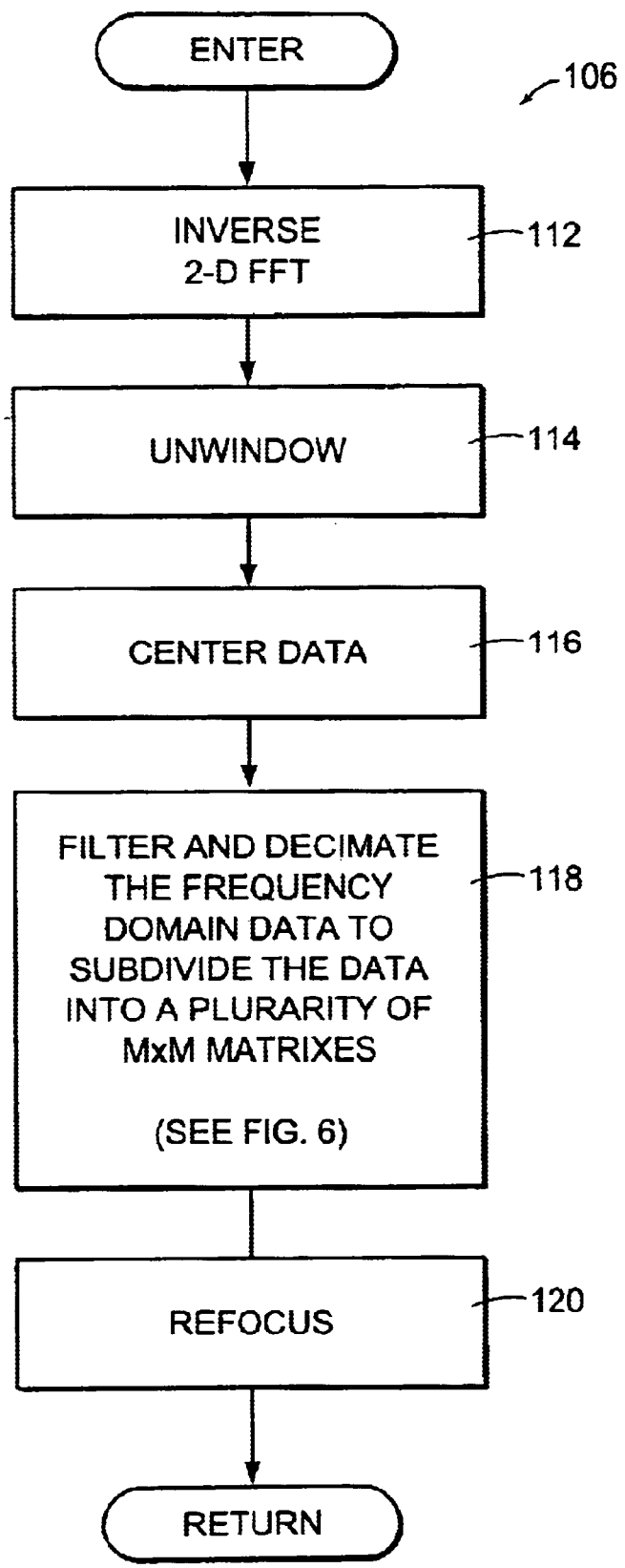
FIG. 5 is a flow chart illustration of the preprocessing routine shown in FIG. 4.

FIG. 5 illustrates the processing steps of the preprocessing routine 106. Upon entering the routine 106, step 112 performs an inverse 2-D FFT on the SAR image data on the line 90. This converts the data from the spatial domain to the frequency domain (also referred to as the waveform domain). Step 114 is then performed to undo the windowing (e.g., amplitude tapering, Hamming windows or Taylor weighting) applied to the data during the conventional SAR image processing. In the conventional SAR imaging, the amplitude tapering is generally applied to the two-dimensional data before the 2-D FFT. Following step 114, the resultant data is now in the frequency domain and each system point response ideally has constant amplitude and linear phase. Step 116 is then performed to center the data, followed by step 118 to filter and decimate the centered frequency domain data in order to sub-divide the data into a plurality of sub-matrices.

Figure 6:
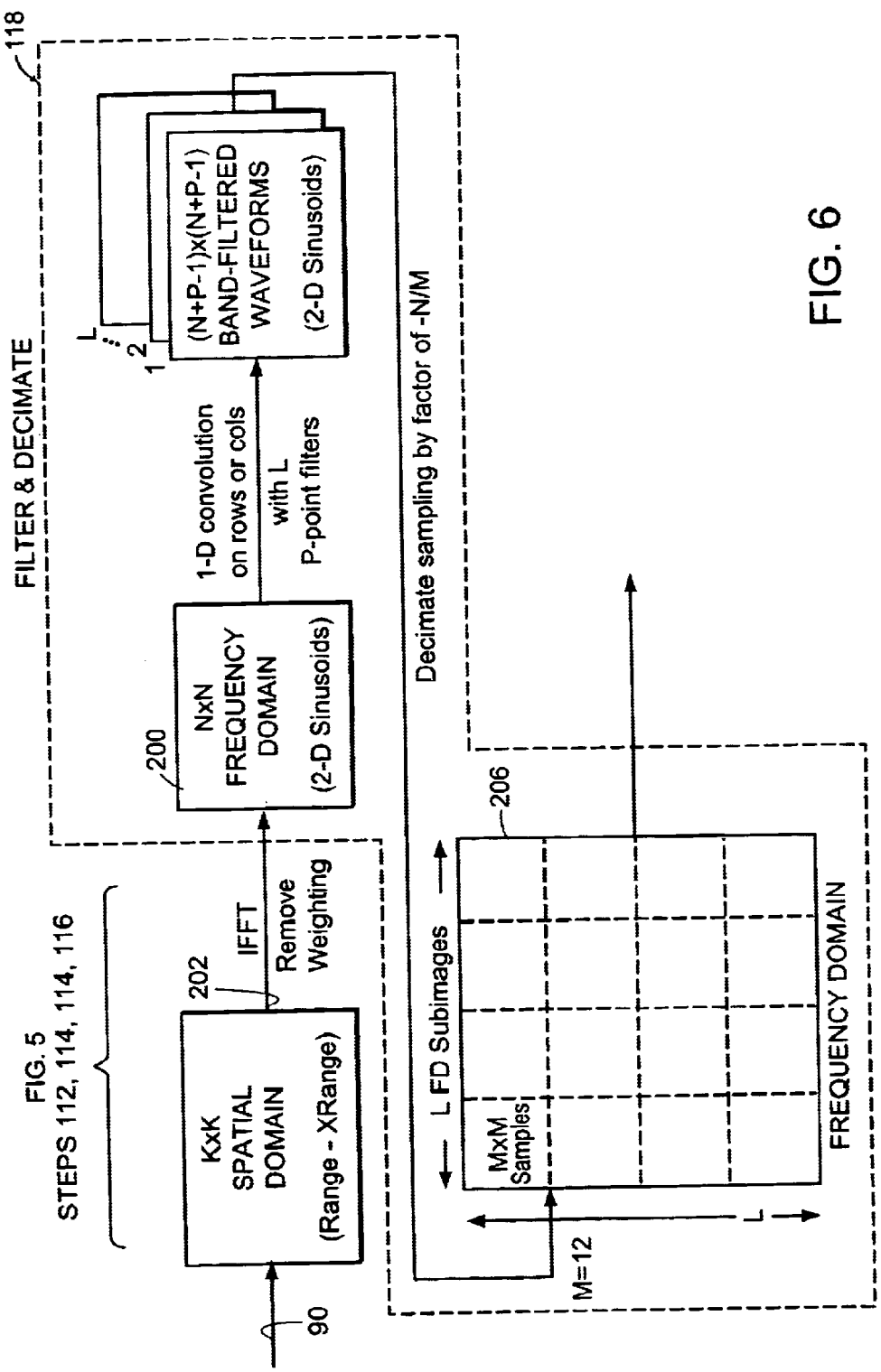
FIG. 6 is a functional block diagram of the filter and decimate process of the preprocessing routine.

FIG. 6 illustrates a functional block diagram of filter and decimate process of step 118 (FIG. 5). The filter and decimate step 118 receives an N×N matrix of frequency domain data on a line 202 from the preceding preprocessing routine (i.e., steps 112, 114, 116 in (FIG. 5). Step 118 performs one-dimensional convolutions on the rows and columns in the N×N matrix 200 using L different P-point filters. This step results in L matrices each of size (N+P−1)×(N+P−1). The matrices are then decimated by a factor of N/M in order to provide a size LM×LM matrix 206 containing M×M sub-matrices (i.e., sub-images). In a preferred embodiment, step 118 effectively sub-divides the frequency domain image (e.g., 1000×1000 pixels) into a plurality of 12×12 pixel subimages (i.e., M=12). Advantageously, sub-dividing into a plurality of sub-matrices reduces the size of a covariance matrix which will be subsequently computed following the make looks routine 108 (FIG. 4) and discussed hereinafter. Referring again to FIG. 5, step 120 is performed next to refocus the data in order to facilitate using the same steering vectors to form the image in subsequent processing steps.

Figure 7:
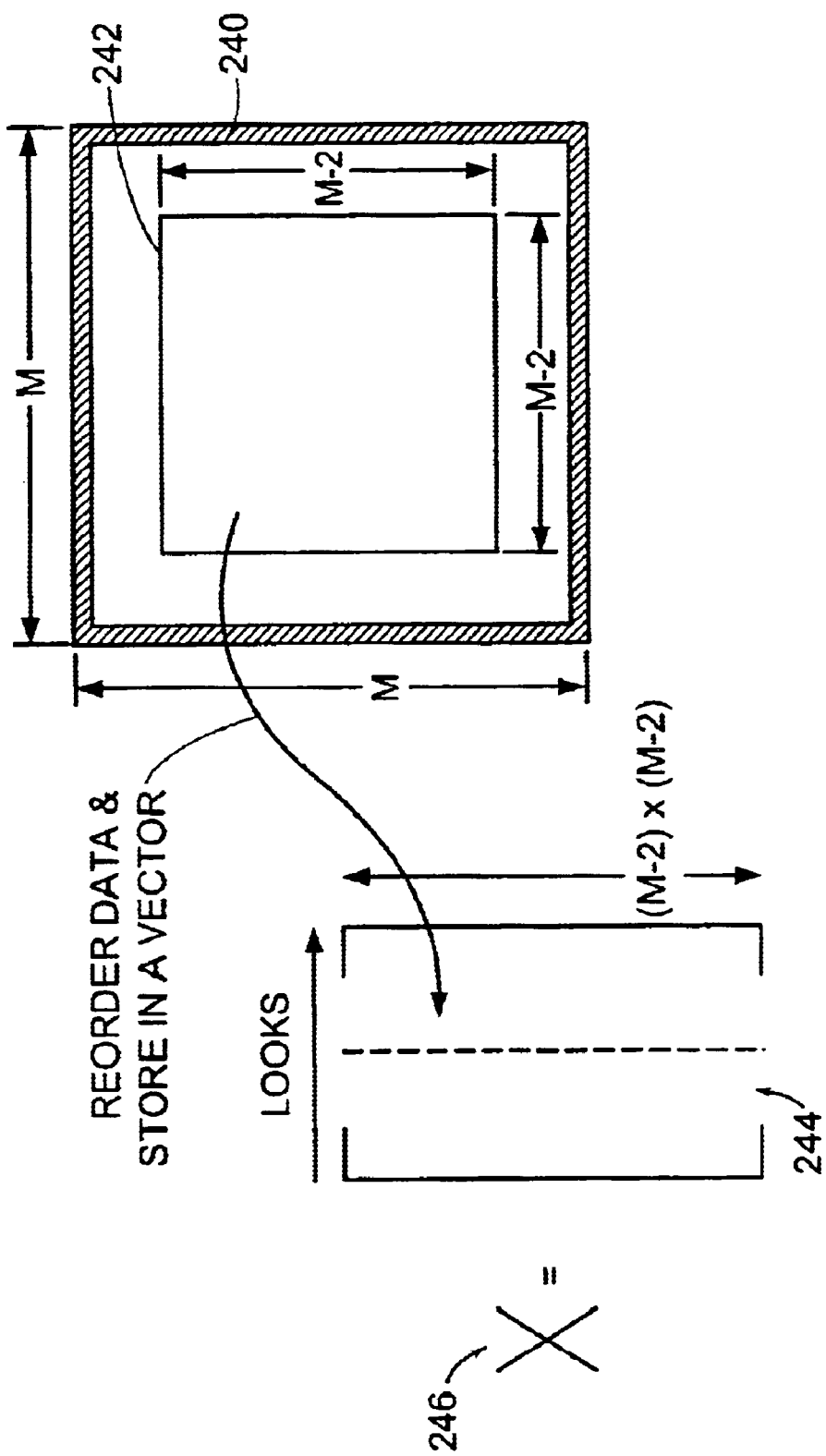
FIG. 7 is a graphical illustration of the processing of the make looks routine.

Referring again to FIG. 4, the next processing step is the make looks routine 108. Functionally, this routine receives the decimated frequency domain data from the preprocessing routine 106, and sub-divides the data into a plurality of "looks". FIG. 7 graphically illustrates the processing of the make looks routine 108. Matrix 240 represents one of the plurality of M×M submatrices generated in by the filter and decimate step 118 (FIG. 6). The make looks routine 108 (FIG. 4) divides the M×M matrix 240 into a plurality of overlapping submatrices (e.g., matrix 242), for example, of size M−2×M−2. The samples from each submatrix 242 are re-ordered to form a vector 244 which becomes one column of matrix X 246 (i.e., each column represents one "look"). For example, if M=12 and submatrices 242 are of size 10×10, there will be nine overlapping submatrices that are formed from the M×M matrix 240, and hence nine vectors (i.e., nine different looks) of length 100 inserted into matrix X 244.

To produce additional looks, a forward-backward averaging then produces nine more looks by taking advantage of symmetry in the frequency domain of the first nine looks (assuming M=10). This is accomplished by taking the first nine looks and reversing the row ordering (e.g., row 1 and row 100 are exchanged, etc.) and taking the complex conjugate. The resultant matrix X is then of dimension 100×18. That is, the matrix X 246 has eighteen (18) looks each containing one-hundred (100) samples.

Referring again to FIG. 4, the next routine in the high definition imaging of the present invention is the compute steering vectors routine 107. The image reconstruction of the present invention requires a steering vector for each output pixel in the enhanced resolution image. For each 12×12 sub-matrix (see matrix 206 in FIG. 6) which is output from the preprocess routine 106, steering vectors are computed which represent the expected phase responses for point scatterers for that 12×12 sub-matrix. For each one of those R' and C desired locations 104, there exists a unique set of steering vectors (i.e., phasers), and a steering vector is computed for each R and C location where an image will be formed. The steering vectors are idealized point scatterer responses. That is, if an ideal point scatterer is located at only one of the pixels, then the SAR provides response that is the steering vector for that scatterer within in a scaling factor and an overall phase constant.

The MLM routine 109 (FIG. 4) is an estimation procedure which replaces the 2-D FFT of the prior art. MLM is also often referred to as the Minimum Variance Beam Forming or Minimum Variance Adaptive Algorithm. Before discussing processing steps of the constrained MLM routine, we shall first briefly discuss the general form of the solution according using the constrained MLM routine.

The image at location range r and cross-range is c can be expressed as:

$$I(r,c) = \min \omega^H R \omega \quad \text{(Eq. 3)}$$

where r is range and c is cross-range. $\omega$ is a vector of weighting coefficients (i.e., beam forming or combining coefficients) which are applied to the covariance matrix R. $R = XX^H$ which is the covariance of the looks matrix X. H is the complex conjugate transpose (also referred to as a Hermetian), and $\|V(r,c)\| = 1$.

As shown in Eq. 3, the constrained MLM routine computes a solution for $\omega$ which minimizes the product $\omega^H R \omega$. That is, the constrained MLM routine 109 iteratively computes a solution for $\omega$ which minimizes the power, or energy, or RCS at this one given pixel (i.e., r,c) of interest. Notably, this is how the algorithm gets the name "minimum variance." The variance of the output pixel with $\omega$ applied is being computed here.

In order to minimize $\omega^H R \omega$, one solution is $\omega = 0$. However, this is an unacceptable solution since there would be no image left. Therefore, possible solutions must be constrained. The first constraint is:

$$\omega^H V(r,c) = 1 \quad \text{Constraint \#1}$$

wherein V is the steering vector which is a point response for an ideal point scatterer location at location r,c. This constraint ensures that gain is preserved, and the output energy can be minimized.

Next, the solution has the form $\omega \alpha R^{-1} V(r,c)$. However, R is rank deficient (i.e., the inverse of R can not be computed). Note, $R^{-1}$ is of the same form as a Wiener filter. Since $R^{-1}$ doesn't exist, other constraints must be placed upon the minimization of $\omega^H R \omega$ to obtain an solution for $\omega$. That is, we can not simply let $\omega = R^{-1} V(r,c)$ because $R^{-1}$ does not exist. Therefore, a second constraint is applied to restrict the norm of the weight vector $\omega$ to be less than a certain value in order to circumvent the non-existence of $R^{-1}$ and reduce the loss of sensitivity to bright scatters. The second constraint can be expressed as:

$$\|\omega\|^2 \leq \beta \qquad \text{Constraint \#2}$$

where $\beta$ is a constant. The solution with constraint #2 will be of the form $\omega \propto (R+\alpha I)^{-1} V(r,c)$ where I is the diagonal identity matrix and $\alpha$ if found via an iteration to satisfy constraint #2.

According to the present invention, a third constraint is to constrain the weight vector $\omega$ to a certain subspace. The solution with constraint #2 will be of the form $\omega \propto R+\alpha I)^{-1} V(r,c)$ where I is the diagonal identity matrix and $\alpha$ is found via an iteration to satisfy constraint #2. That is, $$\omega = V + \epsilon \qquad \text{Constraint \#3}$$

wherein $\epsilon$ is derived from a certain sub space. Constraint #3 requires that weighting vector $\omega$ be some perturbed form of the steering vector V, and that perturbation has to be derived from the looks X. That is, $\epsilon$ is derived from the space perpendicular to V intersected with the data space X. Significantly, constraint #3 prevents the weight vector $\omega$ from becoming orthogonal to the looks X. If the weight vector $\omega$ was allowed to be orthogonal to the looks X, then pixel(s) would be set to black in the output image, which represents a loss of the image background. Therefore, constraint #3 ensures the weight vector $\omega$ remains within a fixed angle or correlation with data space X, and thus $\omega$ provides some non-zero solution which retains the image background.

The solution in view of constraint #3 can also be expressed as $$\omega - Proj_{X\perp} V(r,c) \alpha\ Proj_X (R+\alpha I)^{-1} V(r,c) \qquad \text{(Eq. 4)}$$

where $Proj_{X\perp}$ is the projection onto the orthogonal compliment of the data space, $Proj_X$ is the projection onto the data space, and $\alpha$ is chosen via iteration to achieve constraint #2. The scaling proportion indicated by $\alpha$ (i.e., a proportionality symbol) is chosen to satisfy constraint #1. Notably, $\omega$ replaces the Fourier transform combining coefficients used in prior image forming techniques, and $\omega$ is adaptively computed so satisfy Eq. 3, subject to the three constraints set forth above.

Figure 8:
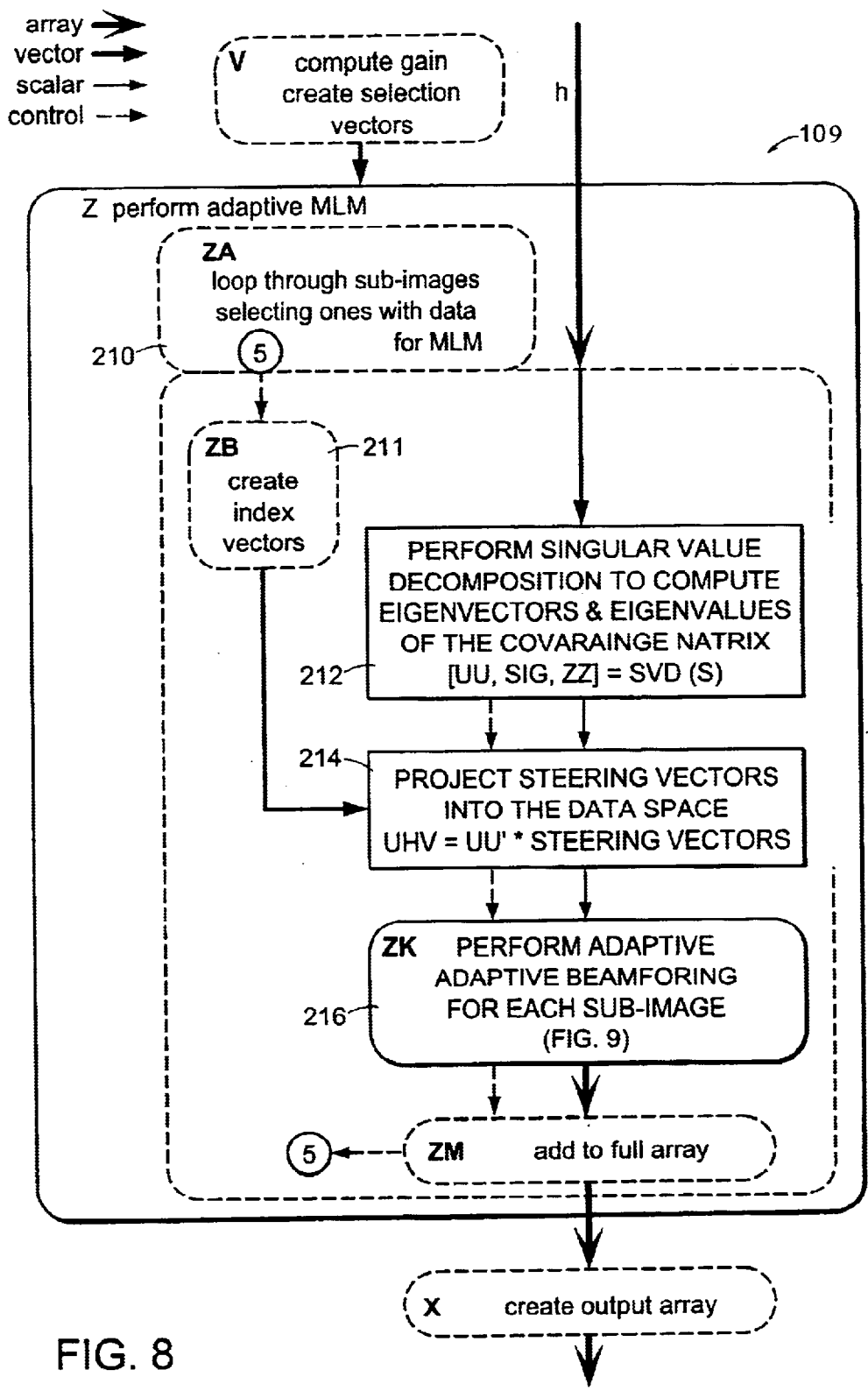
FIGS. 8–9 are flow chart illustrations of the constrained MLM routine shown in FIG. 4.

FIG. 8 is a functional level flow chart illustration of the constrained MLM routine 109. As shown the routine repeats for each the sub-images used to form an image. Step 212 performs a single value decomposition (SVD) on the looks matrix X (FIG. 7). This SVD step 212 is closely related to an eigen decomposition. Step 212 diagonalizes a covariance matrix R which allows it to be subsequently inverted using fewer operations (note, the covariance matrix $R=XX^H$ is not explicitly computed).

As discussed above, the solution requires an inversion of the covariance matrix R (i.e., $\omega = R^{-1} V(r,c)$). The size of the covariance matrix R would have been 100×100 if it was formed explicitly. However, the matrix R actually contains only eighteen (18) non-zero eigenvalues corresponding exactly to the eighteen (18) "looks" used to create it. The rest of the eigenvalues are zero and have no information for forming the image. The important thing then is to find these eighteen (18) eigenvalues because we can invert those and arrive at the equivalent of actually inverting the covariance matrix R. The SVD step 212 identifies the eighteen eigenvalues and provides three matrices referred to as UU, SIG and ZZ. UU is a 100×18 matrix of eigenvectors which represent the eigenvectors of the covariance matrix R. SIG is a matrix of singular values which are the squareroot of the eigenvalues of the covariance matrix R. ZZ is the right-hand singular vector matrix which is a by-product of the SVD and is not used by MLM. ZZ and UU are unitary matrices, i.e., they have orthonormal columns and have a norm of one. UU spans a basis in this complex 100 space which is the same space span by the eighteen looks used to form the matrix X.

Step 212 reduces the covariance matrix R of the system to a diagonal real matrix. This allows the inverse of the covariance matrix R to be easily computed since the matrix inverse will be the inverse of the diagonal elements. Every pixel where an estimate is being formed (i.e., a constrained MLM estimate, which is an image) the inversion of the covariance matrix is taken at least once, and possibly several times in a iterative fashion. Hence, the SVD step 212 reduces the computational burden of the MLM routine.

Step 214 is performed next to project the MLM optimization problem into the eigenspace defined by matrix UU. Specifically, this requires projection of the steering vectors onto the columns of UU. The steering vectors are in the original dimension 100 space, derived from 10×10 sized looks. There is one steering vector for every pixel in the output image. Projection is accomplished via the inner product between the eigenvectors, UU, and the steering vectors, resulting in matrix UHV. At this point, we have reduced the optimization of Eq. 3 to dimension 18, i.e., R is now a real diagonal matrix of dimension 18 (the square of the matrix SIG) and steering vectors are also of dimension 18 in the matrix UHV.

Figure 9:
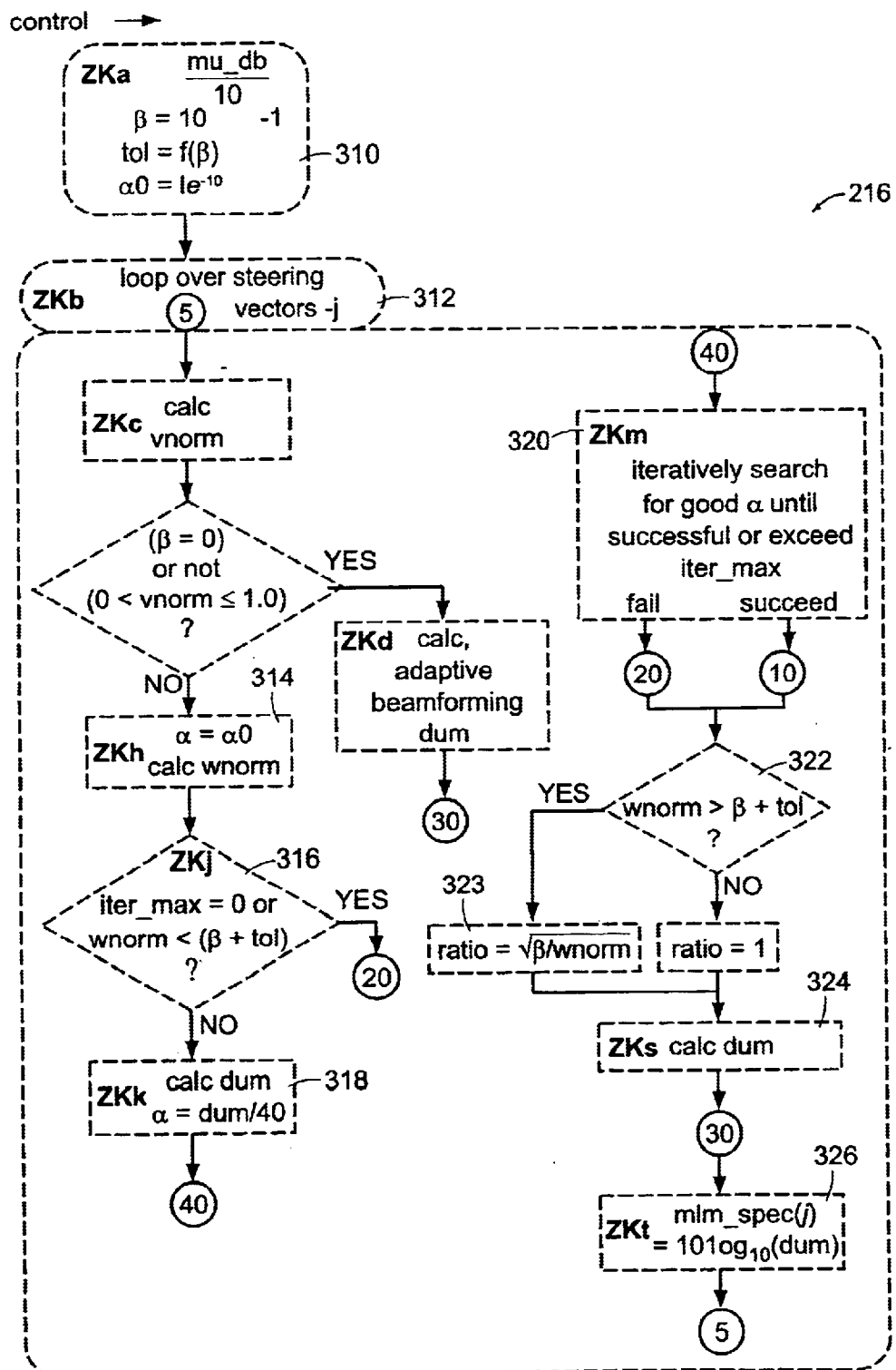

The next step 216 performs the MLM optimization, and is shown in detail in FIG. 9. Step 216 employs matrices UHV and SIG and an operator selected beta value that is the constraint on the norm of the weight vector. A tolerance value TOL is derived to allow the MLM iteration to stop when the norm of $\omega$ is within TOL of beta. The operator actually specifies a value of mu_db, typically from 2 to 8, and then $\beta = 10^{(mu\_db/10)}$. A value of 1 is subtracted in step 310 since this implementation actually constrains the norm of $\epsilon$ in Constraint #3. Note that in constraint #3, $\|\omega\sim^2 = \|V(r,c)\|^2 + \|\epsilon\|^2$ because $\epsilon \perp V(r,c)$, and note that $\|V(r,c)\| = 1$. Hence $\|\omega\|^2 - 1 = \|\epsilon\|^2$ so that Constraint #2 is equivalent to $\|\epsilon\|^2 \leq \beta - 1$.

Since there is no mathematical closed form for solving Eq. 3 with the constraints, Eq. 4 must be solved in an iterative fashion. Hence, to find the correct weight vector $\omega$ we must start with an initial value of alpha ($\alpha$) in Eq. 4, choose the constant of proportionality to satisfy Constraint #1 and then calculate the norm of $\omega$ to check Constraint #2.

Referring to FIG. 9, step 310 sets alpha to a very small value in order to calculate $\omega$ via equation 4 and calculate the norm of $\omega$ in step 314. Hence, Eq. 4 now has the form of $$\omega - Proj_{R1} V\ UU(SIG^2 + \alpha I)^{-1} UHV \qquad \text{(Eq. 5)}.$$

Now that a possible solution to $\omega$ has been computed, the norm of $\omega$ is calculated in step 314 and tested in step 316 to determine if it satisfies constraint #2. Actually, it is the norm of $\epsilon$ (constraint #3) which is computed. Referring to Eq. 5, $\epsilon \propto UU(Sig^2 + \alpha I)^{-1} UHV$, where the constant of proportionality is chosen to satisfy constraint #1. The norm of $\epsilon$ is calculated as the norm of $(SIG^2 + \alpha I)^{-1} UHV$ (times the constant of proportionality) because multiplication by UU preserves the norm (i.e., UU is unitary). Hence, all calculations are performed in the dimension 18 space, avoiding any return the original 100 space.

If constraint #2 is satisfied, then there is no need to select a different value for $\alpha$ (in practice, this happens at a majority of the output pixels). The resultant $\omega$ is applied to R as in Eq.

3 (actually computed in the dimension 18 space) which provides the desired RCS value for the pixel in step 324.

If the norm of ω is too large, then it is necessary to increase a until constraint #2 is satisfied. Hence, step 318 is performed to select a starting value for α, followed by step 320 which is an iterative routine to find the desired α. This iteration proceeds until the norm of ω comes within the value TOL or the predefined maximum number of iterations is reached. If the iteration fails to produce a valid ω (the "yes" branch of step 322), a compromised solution for ω is chosen. The RCS is then computed as described above in step 324, and is converted to decibels in step 326.

The discussion above focused on only one steering vector, V(r,c). To form an image, the procedure of FIG. 9 is repeated for all the selected steering vectors 312. The steering vectors selected correspond to the output pixels associated with the sub-image under consideration. The complete image is then formed by looping over all the sub-images.

Figure 10:
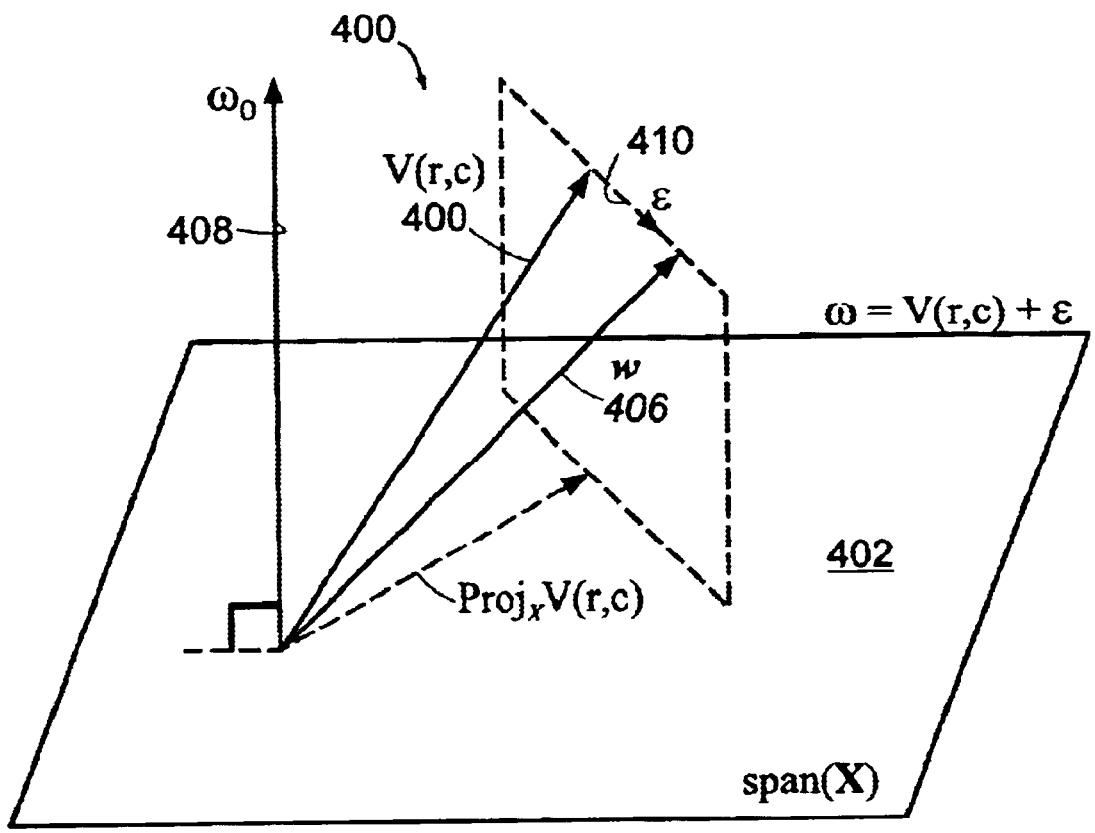
FIG. 10 is a graphical illustration of the constrained nature of the MLM technique of the present invention.

A unique feature of this algorithm is constraint #3 which preserves background information in the image. This constraint is illustrated graphically in FIG. 10. We begin with the steering vector V(r,c) 400 and the looks matrix X. The data space is the linear span of the columns of X, span (X) 402, notionally drawn as a parallelogram. This is also the span of the columns of the covariance matrix $R=XX^H$. The steering vector is shown as a vector not lying in span (X). The MLM algorithm seeks a weight vector ω 406 which minimizes Eq. 3 while first satisfying constraint #1, $\omega^H V(r,c)=1$. Absent any further constraint, one solution would be $\omega_o$ 408, a vector orthogonal to span (X) 402. In this case, $\omega^H X=0$ which results in 0 as a MLM estimate. This will result in a black pixel in the image. Adding constraint #2 may prevent this, but in practice it still allows many such results of 0.

Thus it is necessary to further constrain ω, and the method chosen in constraint #3 is to restrict a 410, the difference between ω and V(r,c), to be chosen from the data space, span (X). Constraint #3 coupled with the gain constraint #1 effectively prevents ω 406 from approaching $\omega_o$ 408 and producing an MLM output of zero. That is, constraint #3 prevents the angle between ω and span (X) from ever exceeding the angle between V(r,c) and span (X), thus guaranteeing that $\|\omega^H X\| > 0$.

Although the present invention has been shown and described with respect to several preferred embodiments thereof, various changes, omissions and additions to the form and detail thereof, may be made therein, without departing from the spirit and scope of the invention.

What is claimed is:

1. A method of processing image data to produce a high definition image, comprising the steps of:

receiving the image data and processing the data to transform the data to the frequency domain and provide frequency domain data indicative thereof; and adaptively processing the frequency domain data using a constrained maximum likelihood estimate method to iteratively compute the high definition image, wherein the image I is expressed in range and cross-range as $I(r,c)=\min \omega^H R\omega$, where ω is a weighting vector and R is a covariance matrix of the frequency domain data, wherein the solutions for $I(r,c)=\min \omega^H R\omega$ are constrained during said adaptive processing to take on solutions which satisfy the following constraints i) $\omega^H V(r,c)=1$, where V is a steering vector, ii) $\|\omega\|^2 \leq \beta$ where β is a constant and iii) ω=V+ϵ which prevents a first angle between said weighting vector ω and a span defined by the frequency domain data from exceeding a second angle between V(r,c) and the span defined by said frequency domain data.

2. A high definition imaging device that processes image data to produce a high definition image, comprising:

means for receiving the image data and for processing the data to transform the data to the frequency domain and provide frequency domain data indicative thereof; and means for adaptively processing the frequency domain data using a constrained maximum likelihood estimator to iteratively compute the high definition image, wherein the image I is expressed in range and cross-range as $I(r,c)=\min \omega^H R\omega$, where ω is a weighting vector and R is a covariance matrix of the frequency domain data, wherein the solutions for $I(r,c)=\min \omega^H R\omega$, are constrained to take on solutions that satisfy the following contraints i) $\omega^H V(r,c)=1$, where V is a steering vector, ii) $\|\omega\|^2 \leq \beta$ where β is a constant and iii) ω=V+ϵ which prevents a first angle between said weighting vector ω and a span defined by the frequency domain data from exceeding a second angle between V(r,c) and the span defined by said frequency domain data.

3. A synthetic aperture radar system that processes image data to produce a high definition image, said system comprising:

a transmitter that generates a transmit electromagnetic signal;

an antenna that receives and radiates said transmit electromagnetic signal, and receives a reflected electromagnetic signals and provides a received signal indicative thereof;

a receiver responsive to said received signal and provides image data, includes

A. means for receiving the image data and for processing the data to transform the data to the frequency domain and provide frequency domain data indicative thereof; and B. means for adaptively processing the frequency domain data using a constrained maximum likelihood estimator to iteratively compute the high definition image, wherein the image I is expressed in range and cross-range as $I(r,c)=\min \omega^H R\omega$, where ω is a weighting vector and R is a covariance matrix of the frequency domain data, wherein the solutions for $I(r,c)=\min \omega^H R\omega$, are constrained to take on solutions that satisfy the following constraints i) $\omega^H V(r,c)=1$, where V is a steering vector, ii) $\|\omega\|^2 \leq \beta$ where β is a constant and iii) ω=V+ϵ which prevents a first angle between said weighting vector ω and a span defined by the frequency domain data from exceeding a second angle between V(r,c) and the span defined by said frequency domain data.

* * * * *